W. EATON.

Improvement in Milk-Coolers.

No. 132,454.  Patented Oct. 22, 1872.

Witnesses  
Edmund Masson  
John R. Young

Inventor.  
Wm Eaton, by  
Prindle and Co.  
Attys.

UNITED STATES PATENT OFFICE.

WILLIAM EATON, OF NORWICH, NEW YORK, ASSIGNOR OF TWO-THIRDS HIS RIGHT TO E. C. BROOKS AND A. H. GOODWIN, OF SAME PLACE.

IMPROVEMENT IN MILK-COOLERS.

Specification forming part of Letters Patent No. 132,454, dated October 22, 1872.

*To all whom it may concern:*

Be it known that I, WM. EATON, of Norwich, in the county of Chenango and in the State of New York, have invented certain new and useful Improvements in Milk-Coolers; and do hereby declare that the following is a full, clear, and exact description thereof, reference being had to the accompanying drawing making part of this specification, in which—

Figure 1:
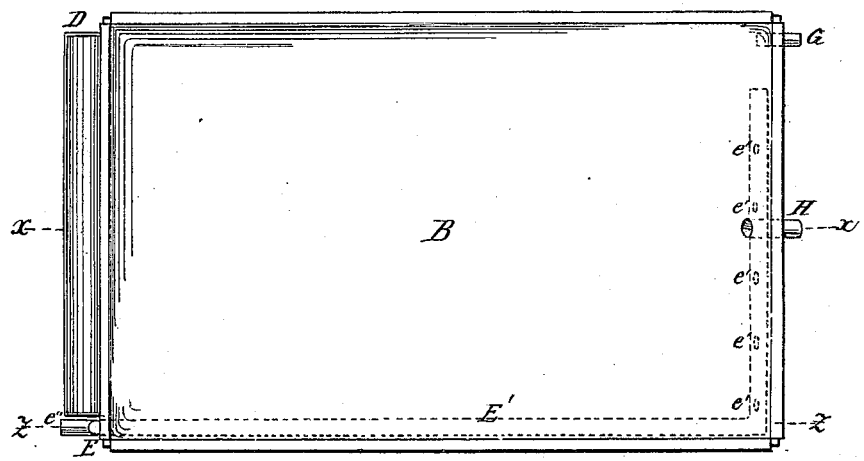
Figure 2:
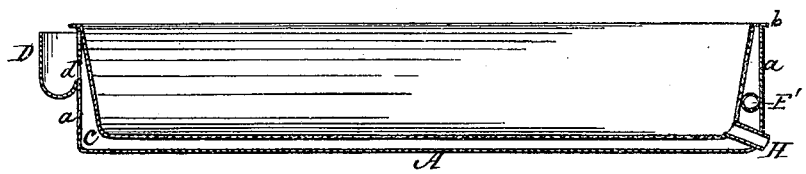
Figure 3:
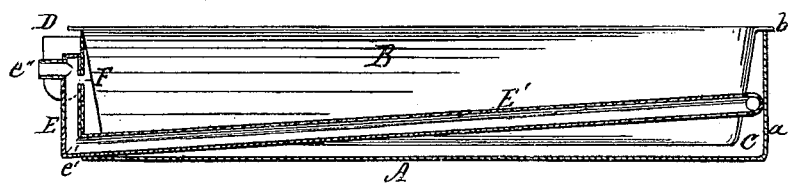

Figure 1 is a plan view of the upper side of my device, and Figs. 2 and 3 are vertical longitudinal sections of the same on lines $xx$ and $zz$, respectively, of Fig. 1.

Letters of like name and kind refer to like parts in each of the figures.

My invention is an improvement upon a class of appliances in which the temperature of milk is regulated by means of water contained within a space formed between the exterior of the milk-pan and the interior of the water-pan; and it consists, principally, in a tempering-reservoir secured upon and forming part of the water pan or vat, substantially as and for the purpose hereinafter specified; it consists further, in the construction and arrangement of the water overflow or discharge-pipe, substantially as and for the purpose hereinafter shown; it consists, finally, in the device as a whole, when its several parts are constructed and combined substantially as and for the purpose hereinafter shown and described.

In the annexed drawing, A represents a sheet-metal pan or vat, having, preferably, a rectangular form in plan view, and vertical sides $a$, within which is placed a second pan, B, constructed with outward flaring sides, and projecting flanges $b$, that extend over and embrace the upper edges of said sides $a$. The inner pan B is constructed with round horizontal and vertical corners for the purpose of rendering it more easily cleaned, and has a less depth than the outer pan, so that between the bottoms and sides of said pans is left a space, C, for containing water. Secured to or upon one end of the outer pan A, at and immediately below the upper edge of the same, is a reservoir, D, open at its top, and communicating with the interior of said pan by means of a series of openings, $d$, which are formed in and through said end. This reservoir is for containing a supply of water and ice, whenever the temperature of the former is not sufficiently low to answer the desired purpose. Secured upon the end of the outer pan, at or near its corner and immediately adjacent to the end of the reservoir D, is a pipe, E, which is closed at both ends, and communicates at its inner side and lower end with the interior of said pan. From the opening $e$, provided in and through the wall of the pan, a second pipe, E', extends along the side of said pan to its opposite end, across which said pipe extends to or near the opposite side. The horizontal portion of the pipe E' is placed at a point midway between the bottom and upper edge of the pan, and is provided with a series of small openings, $e'$, through which access is had to its interior. A small pipe, $e''$, extending horizontally outward from the upper end of the vertical pipe E, completes this portion of the device, the operation of which is as follows:

The water employed for regulating the temperature of the milk passes from the reservoir into the space C between the pans, through which it passes to the opposite end of said space, at which point, having accomplished its mission, said water enters the pipe E', and passing through the same into the pipe E finally escapes through the pipe $e''$, into the waste-water reservoir. By this arrangement of the overflow or waste-water outlet, the water is compelled to traverse the whole length of the pans before it can escape, by which means it will impart to the milk the full effect of its different temperature, while, by arranging the supply and discharge openings at one end of the vat, less expense and trouble are occasioned in its arrangement. If desired, an opening, F, may be provided for the passage of water from the space C directly into the upper end of the overflow-pipe E; but it is believed that such an arrangement will not prove as advantageous as that hereinbefore described. A pipe, G, placed at the lower side and end of the pan A, for discharging all water from said pan when not in use, and a discharge-pipe H, extending from the end of the milk-pan B, outward through the end of said water-pan, completes said pans, which are hermetically sealed or joined at their upper edges, so as to render the water-space tight, except at the points above named.

The advantages obtained by this construction of parts are efficiency and ease of operation, durability, and comparatively small cost.

Having thus fully set forth the nature and merits of my invention, what I claim as new, is—

1. In a milk-cooler, a tempering-reservoir secured upon the outer side and forming part of a water-vat, substantially as and for the purpose specified.

2. The pipes E E' and $e''$, constructed and arranged upon or within the water-pan A, substantially as and for the purpose shown.

3. The hereinbefore-described device, as a whole, when its parts are constructed and combined substantially as and for the purpose specified.

In testimony that I claim the foregoing I have hereunto set my hand this 6th day of August, 1872.

WILLIAM EATON.

Witnesses:
EDWIN C. BROOKS,
C. A. BROWN.